United States Patent [19]

Mock

[11] Patent Number: 5,413,238

[45] Date of Patent: May 9, 1995

[54] CLOSURE UNIT ON A CONTAINER FOR FLOWABLE PRODUCTS

[75] Inventor: Elmar Mock, Biel/Bienne, Switzerland

[73] Assignee: Tetra Alfa Holdings S.A., Pully, Switzerland

[21] Appl. No.: 986,914

[22] Filed: Dec. 8, 1992

[30]  Foreign Application Priority Data

Dec. 12, 1991 [CH] Switzerland ............... 03684/91
Dec. 12, 1991 [CH] Switzerland ............... 03685/91
Dec. 12, 1991 [CH] Switzerland ............... 03689/91

[51] Int. Cl.⁶ ............................................. B65D 17/32
[52] U.S. Cl. .................................. 220/268; 220/254; 220/259; 220/339; 220/359; 229/125.15; 222/562; 222/569; 222/556
[58] Field of Search ............ 220/269, 254, 256, 258, 220/259, 265, 268, 307, 339, 359; 229/125.15, 125.19, 125.28; 222/545, 569, 556

[56] References Cited

U.S. PATENT DOCUMENTS

| | | |
|---|---|---|
| 3,443,005 | 5/1969 | Braun . |
| 3,917,789 | 11/1975 | Heisler . |
| 3,964,609 | 6/1976 | Perrella ........................ 220/254 X |
| 4,082,201 | 4/1978 | Bittel ............................ 220/339 |
| 4,171,749 | 10/1979 | Obrist et al. . |
| 4,391,385 | 7/1983 | Rausing ........................ 220/307 |
| 4,397,401 | 8/1983 | Ueno et al. .................. 220/260 |
| 4,462,504 | 7/1984 | Roth et al. . |
| 4,669,640 | 6/1987 | Ando et al. . |
| 4,711,372 | 12/1987 | Gach . |
| 4,735,335 | 4/1988 | Torterotot ..................... 220/270 |
| 4,770,325 | 9/1988 | Gordon et al. . |
| 4,795,065 | 2/1989 | Ashizawa et al. ............ 220/269 X |
| 4,858,793 | 8/1989 | Stone . |
| 4,887,747 | 12/1989 | Ostrowsky et al. . |
| 4,892,217 | 1/1990 | Shastal . |
| 4,949,882 | 8/1990 | Take . |
| 4,986,465 | 1/1991 | Jacobsson et al. ............ 229/123.3 |
| 4,988,012 | 1/1991 | Shastal ......................... 220/258 |
| 5,054,641 | 10/1991 | Sato ............................. 220/270 |
| 5,062,542 | 11/1991 | Morton ........................ 220/269 |
| 5,197,618 | 3/1993 | Goth ............................ 215/232 |

FOREIGN PATENT DOCUMENTS

| | | |
|---|---|---|
| 0079676A | 5/1983 | European Pat. Off. . |
| 0224593A | 6/1987 | European Pat. Off. . |
| 0268690A | 6/1988 | European Pat. Off. . |
| 0316269A | 5/1989 | European Pat. Off. . |
| 2647088 | 11/1990 | European Pat. Off. . |
| 1941479 | 2/1970 | Germany . |
| 2636259 | 5/1977 | Germany . |
| 61-47223A | 3/1986 | Japan . |
| WO84/00531 | 2/1984 | WIPO . |
| WO90/14287 | 11/1990 | WIPO . |

Primary Examiner—Allan N. Shoap
Assistant Examiner—Vanessa Caretto
Attorney, Agent, or Firm—Frishauf, Holtz, Goodman & Woodard

[57] ABSTRACT

A closure unit has, for additionally securing a new state, a predetermined breaking point (5), which at least partly passes around the pouring opening circumference and connects the pouring part (1) and the closure part (2). In order that the predetermined breaking point (5) is protected against damage and can only be broken by a force directed in the same direction as that necessary for opening the closure unit, on the outside of the closure unit the predetermined breaking point (5) is covered by a protection/support zone (10) and can also be supported on the inside of the closure unit by support zones (11), wherein the predetermined breaking point (6) is made of a different material (A) from the material (B) of the protection/support zone (10).

6 Claims, 6 Drawing Sheets

CLOSURE UNIT ON A CONTAINER FOR FLOWABLE PRODUCTS

BACKGROUND OF THE INVENTION

The invention is in the field of the packaging industry and relates to a closure unit and a production process for the same.

On containers for liquids, such as e.g. metal cans or coated cardboard receptacles, for the purpose of a resealable opening and easy pouting, closure units are often provided, which are preferably made from plastic and comprise a pouring part with a pouring opening and a closure part closing the pouring opening of the pouring part and which are fitted in an opening of the container. The two Swiss patent applications 2740/91 and 2739/91 (application date 17.9.91) of the same Applicant describe such closure units. The described closure units are moulded according to a multimaterial injection moulding process and comprise at least two materials differing with respect to at least one characteristic.

In application 2740/91, it is required for problem-free transportation that the closure unit is constructed in such a way that, prior to the first opening, it can withstand without damage a rough transportation process, but can still be opened the first time with little force expenditure. As an additional securing feature for the new state a predetermined breaking point between the pouring part and the closure part is proposed, which is broken open at the first opening. This predetermined breaking point passes between the closure part and the pouring part around at least a portion of the pouring opening circumference and namely in an area made from one material extending in the closure part and the pouting part. It is a linear zone, in which the material is very thin.

Known closure units moulded from one material can also have such predetermined breaking points. Such closure units are moulded in a pseudo-closed state, i.e. the closure part is shaped by means of a predetermined breaking point onto the pouting part. During the first opening the closure part is separated from the pouring part along the predetermined breaking point. As the broken predetermined breaking point is not adequate as a sealing surface on resealing during the latter operation the closure part must be brought into a further closed state, which mainly consists of the closure part being forced more deeply over the pouring part. In the new state (pseudo-closed state) the predetermined breaking point is located directly on the outer surface of the closure unit and constitutes an easily damageable point.

The object of the invention is to provide a closure unit which, in the new state is additionally secured by a predetermined breaking point between the pouring part and the closure part, but whose closed state is the same when new and when resealed (no pseudo-closed state) and which in the reseated state is sealed by sealing surfaces and not sealing edges. The predetermined breaking point is improved compared with known predetermined breaking points with respect to its exposability, its sensitivity to forces directed differently to the forces required for closure unit opening and/or with regards to aids enabling the predetermined breaking point to be precisely positioned and to limit the force required for breaking it open.

The inventive closure unit is produced according to a multimaterial injection moulding procedure from at least two thermoplastic materials, which differ as regards at least one characteristic. At least one area consisting of one of the materials extends from the pouring part into the closure part and can form a predetermined breaking point at the transition. To the area having the predetermined breaking point is advantageously on the outside of the closure unit closely fitted an area made from a different material, which as a protection/support zone extends beyond the predetermined breaking point and is advantageously firmly connected on the closure part-side of the predetermined breaking point to the area having the latter, whereas on the pouting part-side of the predetermined breaking point it adheres either not at all or only very slightly to the area having said point, so that in the area between the pouring part and the closure part a separable sealing surface pair is formed.

The described protection/support zone can also be located on the inside of the closure unit, but can then only fulfil a very limited protection function.

The described outer protection/support zone can be supplemented by an identical protection/support zone on the inside of the closure unit or by one or two support zones, which on the pouting part side and/or closure part side closely fit and are firmly connected to the area having the predetermined breaking point and extend as close as possible to but do not extend over said point.

As a result of the described protection/support zones and support zones the predetermined breaking point is protected against damage and supported in such a way that it cannot be broken open by external pressure on the closure part, by pressure in the interior of the container or by forces acting laterally on the closure unit.

If the inventive closure unit has a hinge as a permanent connection between the closure part and the pouring part, and if this hinge forms part of the wall of the pouring opening, the predetermined breaking point extends only partly round the pouring opening circumference. If the hinge is positioned outside the pouring opening or if the closure unit does not have any connecting means between the pouting part and the closure part, the predetermined breaking point extends all around said opening.

If the hinge consists of a thin material area pivotally connecting the closure part and the pouting part, this area forms a continuation of the predetermined breaking point, such that the predetermined breaking point and the thin material zone form a closed line around the pouring opening. In order to prevent an extension of the predetermined breaking point into the thin connecting zone by propagation of cracks when the predetermined breaking point is broken or when the closure unit is reopened, special precautions must be taken at the end zones of the predetermined breaking point.

The area comprised of one material which extends from the pouring part into the closure part and in which the predetermined breaking point is located, may be such shaped that it covers, at least in the closed state of the closure unit the whole inner surface of the latter. This is advantageous if the goods to be stored are only compatible with one of the materials of which the closure unit is made. For such a closure unit it is only possible to provide a protection/support zone on the outside.

BRIEF DESCRIPTION OF THE DRAWINGS

Exemplified embodiments of the inventive closure unit are described in greater detail hereinafter relative to the drawings, wherein.

DETAILED DESCRIPTION

Figure 1:
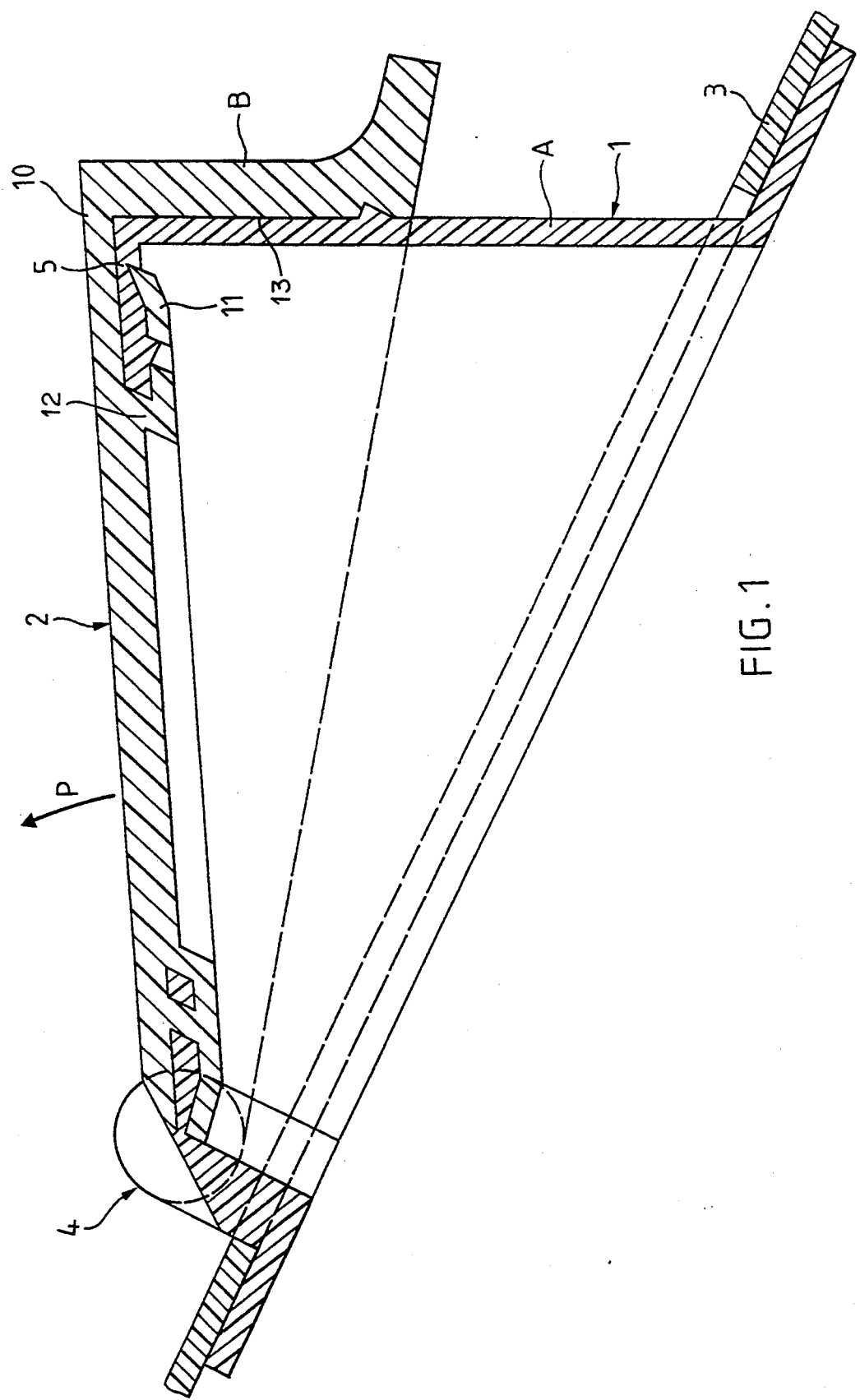
FIG. 1 A section through an exemplified embodiment of the inventive closure unit with hinge and external and internal protection/support zone (with the section plane at right angles to the hinge pivot axis)

FIG. 1 is a section through an exemplified embodiment of a closure unit according to the invention. It comprises a pouring part 1 and a closure part 2, which are interconnected by a hinge 4 so as to be pivotable to a limited extent. The closure unit is fitted in an opening of a container 3. The closure unit comprises at least two areas of in each case one material A or B, whereof at least one material extends both in the pouring part 1 and in the closure part 2. At the transition between the pouring part and the closure part, said area has a predetermined breaking point 5, which at least partly extends around the inner pouring opening circumference. It is a narrow zone in which the material is very thin. The represented predetermined breaking point 5 has on both the outside and inside of the closure unit, zones (10 and 11) of a second material B, which protect and support the predetermined breaking points and which, further removed from the latter and together with the area having the point, can form separable sealing surface pairs (i.e. the contacting surfaces form sealing surfaces).

Figure 2:
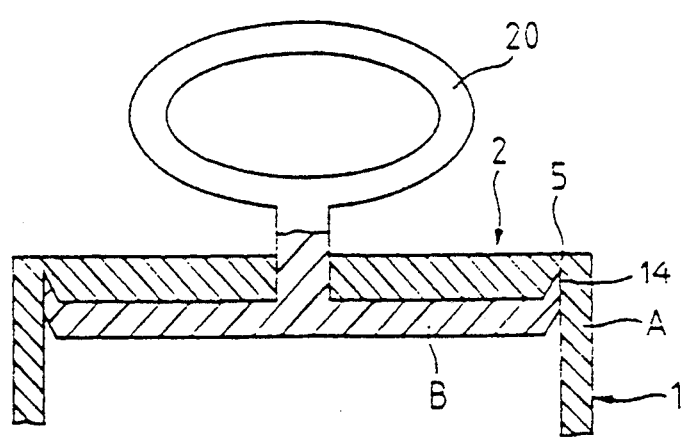
FIG. 2 Another embodiment with only an internal protection/support zone.

FIG. 2 shows a further embodiment of the inventive closure unit, which is also made from two materials A and B, in which the area of material A extends from the pouring part 1 into the closure part 2 and has a predetermined breaking point 5. Unlike in the case of the embodiment shown in FIG. 1, it only has a zone of material B supporting the predetermined breaking point 5 on the inside of the closure unit. The closure part can be raised from the pouring part, it is e.g. provided with a tab 20.

Figure 3:
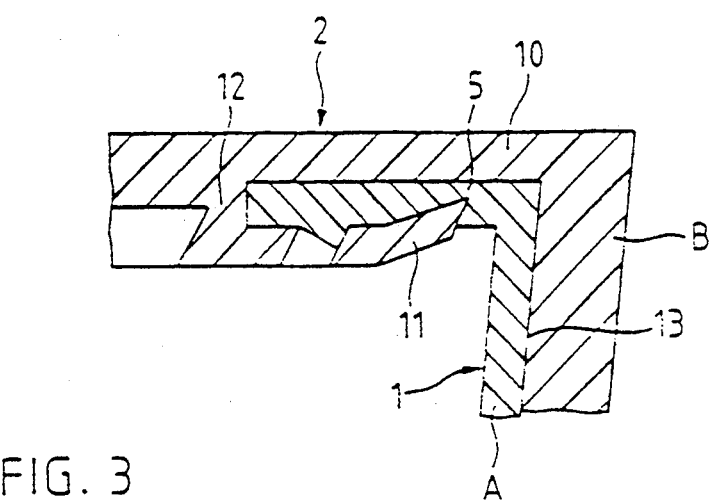
FIG. 3 The predetermined breaking point of the embodiment according to FIG. 1 as a larger scale detail.

FIG. 3 shows the predetermined breaking point according to FIG. 1 in detail. The area made from material A has at the transition from the pouring part 1 to the closure part 2 a thin material zone, which extends linearly along the inner circumference of the pouting opening and forms the predetermined breaking point 5. A protection/support (protection and support) zone 10 made from another material B is closely fitted to the predetermined breaking point 5 and at least to the area closely surrounding it on the outside of the closure unit. This protection/support zone 10 is on the closure part-side of the predetermined breaking point connected e.g by self-closure means 12 to the area with said predetermined breaking point. On the pouring part-side of the predetermined breaking point, the protection/support zone 10 is not connected to the area having the latter, but instead forms therewith a separable sealing surface pair 13 (i.e., adjacent surfaces seal against each other).

Figure 4:
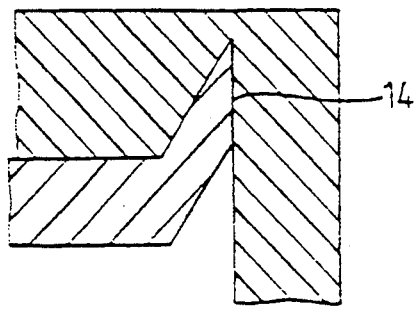
FIG. 4 The predetermined breaking point of the embodiment according to FIG. 2 as a larger scale detail.

FIG. 4 shows in detail the predetermined breaking point of the embodiment according to FIG. 2. Unlike in the case of the outer sealing surface pair 13 shown in FIG. 3 and located on the outside of the pouring opening wall, said FIG. 2 embodiment has an inner sealing surface pair 14 (i.e., adjacent contacting surfaces seal against each other) on the inside of the pouring opening wall.

For breaking open the predetermined breaking point, a force can now act on the outer protection/support zone 10 (FIG. 3) and namely on the pouring part side, where it does not or only slightly adhere to the area having the predetermined breaking point. As shown in FIG. 1 such a force (arrow P) is necessary, to pivot the closure part into an opened position, i.e for breaking the predetermined breaking point if still intact and for moving the entire area made from material B and the closure part-side part of the area of material A.

The outer protection/support zone 10 can be supplemented on the inside of the closure unit e.g. by a support zone 11 which, as shown in FIGS. 1 and 3, can be part of the area made from material B, or a part of an area made from a further material. This support zone 11 is also firmly connected to the area having the predetermined breaking point, e.g. by self-closure means 12 and on the closure part-side extends as close as possible to the predetermined breaking point, e.g. as shown in FIG. 3 directly into said point. This support zone 11 assumes a further support function and together with the protection/support zone 10 on the outside of the predetermined breaking point, ensures that zones immediately alongside the predetermined breaking point are not deformed or torn when it is broken open and therefore contributes to a precise location of the predetermined breaking point and to a limitation of the force necessary for breaking it open.

Variants of the embodiment of the predetermined breaking point shown in FIG. 3 comprise instead of the one-sided support zone on the inside of the closure unit a protection/support zone covering the inside of the predetermined breaking point, or that a support zone is provided both on the closure part side and the pouring part side of the inside of the closure unit.

Further variants comprise the protection/support zone 10 and/or the support zone 11 being on the closure part-side firmly connected to the area having the predetermined breaking point by melted together surfaces or by glued together surfaces with a corresponding binder, instead of by self-closure means 12.

All these connecting means between the areas made from different materials can easily be produced with a multimaterial injection moulding process. A blank is moulded from a first material A and advantageously has the predetermined breaking point. The moulds used for moulding the blank are then at least partly moved or replaced by others and using a material B the finished moulding is moulded, the blank at least partly serving as the mould. Moulding stages with further materials can follow. As a function of the material pairing and the temperature control during the moulding of the second material, the moulded together surfaces have melted together to a greater or lesser extent and consequently adhere to a greater or lesser extent to one another. Serf-closure means for the firm connection of the areas made from the different materials can be obtained by corresponding geometrical shaping of the areas (cf. also FIGS. 7a and 7b). Between the moulding stages a binder can be applied to partial surfaces of the already moulded part, which lead to an adhesion between the areas.

The predetermined breaking point is an area where the material is very thin. During the moulding process it is very sensitive and not very stable. If in a further moulding stage it is to be moulded around on both sides by a further material, the moulds must be removed on either side from the predetermined breaking point, so that it must be sufficiently stable to keep the area stable. It has been found that the predetermined breaking point can be made thinner if at the time of moulding around with the other material it can at least be partly supported on one side by a stationary mould part, i.e. at least on one side it is not entirely covered by a zone of a further material. Besides FIG. 3, this is also explained relative to FIGS. 5 to 8, which show further embodiments of inventive closure units with predetermined breaking points and a diagrammatic representation of their manufacture.

The predetermined breaking point 5 according to FIG. 3 is entirely covered on the outside of the closure unit, but on its inside only on the closure part side, by a protection and/or support zone. It is not covered internally on the pouring part side, i.e. the mould used for this area does not have to be removed for the moulding stage of material B and can support the predetermined breaking point during this moulding stage.

Figure 5:
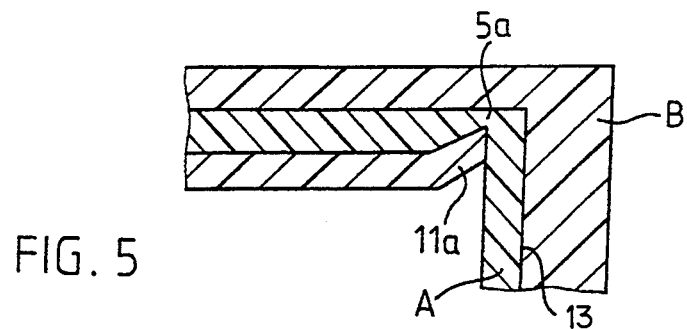
FIG. 5 Another embodiment of the predetermined breaking point for an inventive closure unit.

FIG. 5 shows a predetermined breaking point 5a, which on the inside of the closure unit is covered on all sides by a protection/support zone 11a, so that on moulding these zones from material B no mould can support the predetermined breaking point.

Figure 6:
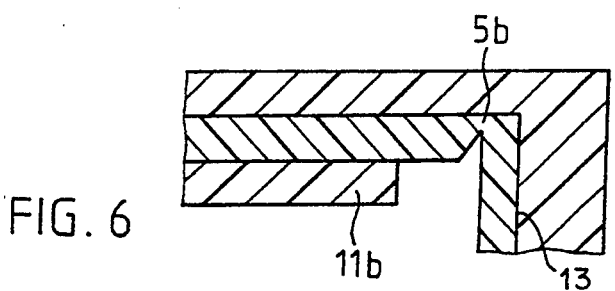
FIG. 6 A further embodiment of the predetermined breaking point for an inventive closure unit.

A predetermined breaking point 5b according to FIG. 6 is of an optimum nature for production. As the predetermined breaking point 5b and its immediately surrounding area are not covered by a support zone 11b on the inside of the closure unit, they can be supported by a mould during the moulding of material B, as is shown with the aid of FIGS. 7a and 7b.

Figure 7A:
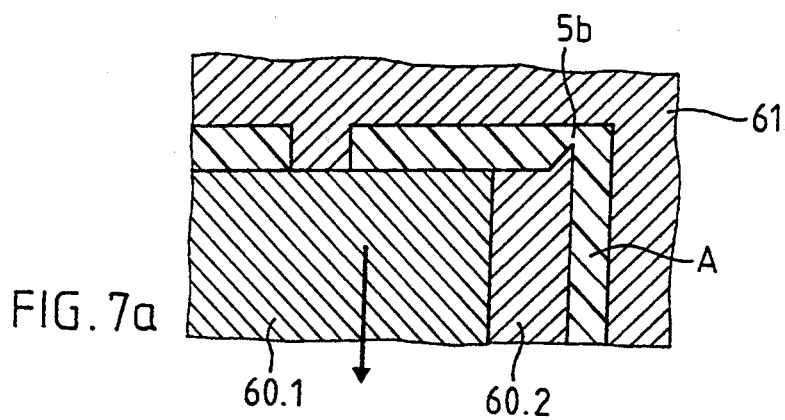
FIGS. 7a and 7b To The production of an inventive closure unit with a predetermined breaking point according to FIG. 6 in two moulding stages (moulding the first material in FIG. 7a and moulding the second material in FIG. 7b)

FIG. 7a shows the moulding stage of the material A for moulding a blank having the predetermined breaking point 5b. For this moulding stage use is made of an inner mould (60.1 and 60.2) comprising two parts, together with an outer mould 61.

Figure 7B:
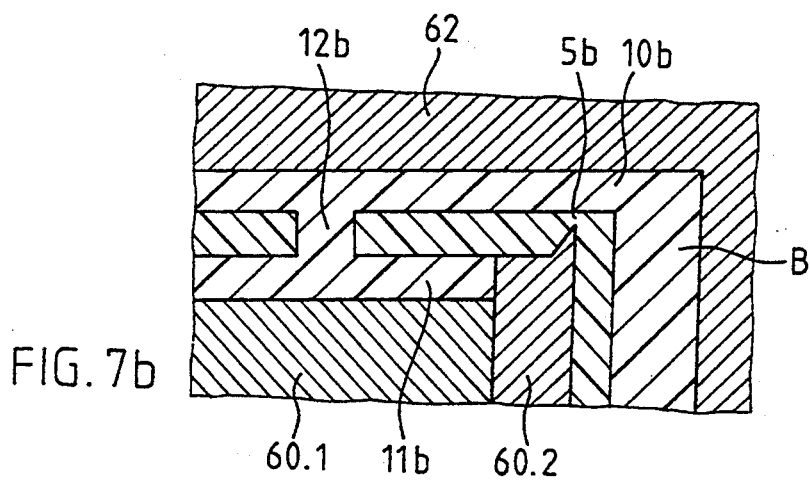

FIG. 7b shows the moulding stage of material B in which inter alia the protection/support zone 10b and support zone 11b are moulded. As the support zone 11b is not intended to cover the predetermined breaking point 5b and its immediately surrounding area, it is possible to leave the inner mould 60.2 stationary during both moulding stages, so that it can support the predetermined breaking point, whereas the inner mould 60.1 is displaced and the mould 61 replaced by the mould 62. This makes it possible to mould much thinner predetermined breaking points. FIGS. 7a and 7b also show that the self-closure means 12b for the firm connection of the two areas can be easily produced.

If an inner support zone, as shown in FIG. 6, does not satisfy the requirements, it is also possible to mould the inner support zone in a first moulding stage, the predetermined breaking point in a second and the outer protection/support zone in a third. The predetermined breaking point is in the third moulding stage of such a production process supported by the inner support zone.

Figure 8A:
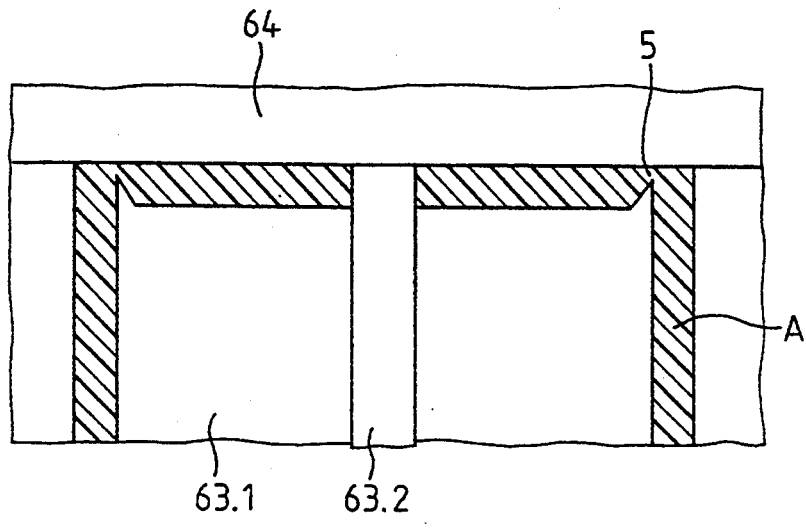
FIGS. 8a and 8b The production of an inventive closure unit with a predetermined breaking point according to FIG. 4 in two moulding stages (moulding of the first material in FIG. 8a and moulding of the second material in FIG. 8b)
Figure 8B:
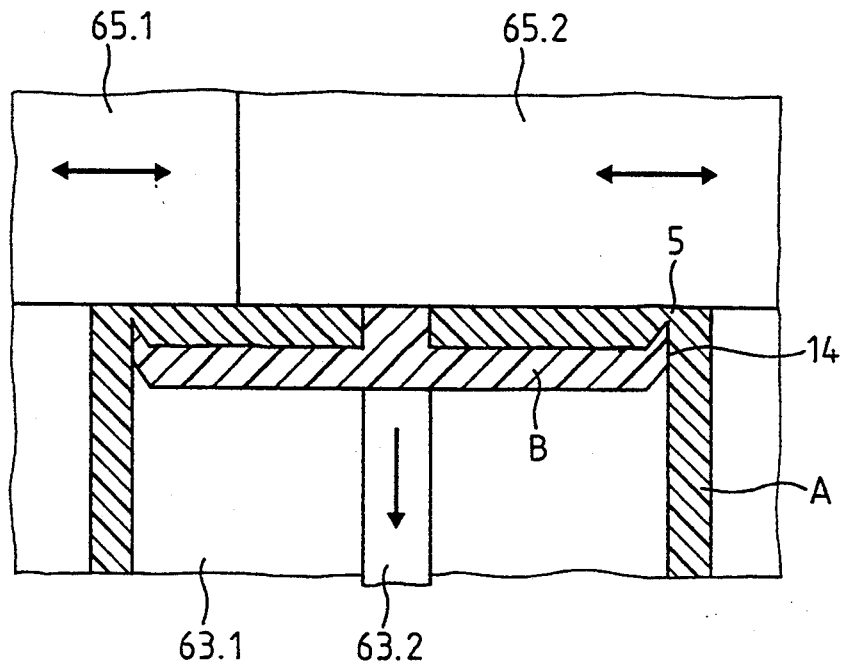

FIGS. 8a and 8b show in the same way as FIGS. 7a and 7b the production of a predetermined breaking point according to FIG. 4. In the first moulding stage (FIG. 8a), the area having the predetermined breaking point 5 is moulded from material A (blank) using moulds 63.1, 63.2 and 64. For the second moulding stage the moulds 63.1 and 63.2 are moved away from the blank and the mould 64 is replaced by moulds 65.1 and 65.2 (laterally due to the tab). Between the two moulding stages the predetermined breaking point 5 is temporarily only supported on one side or not at all, but cannot be pressed out of shape by the material B, because it is supported by the moulds 65.1 and 65.2 during the second moulding stage.

Figure 9:
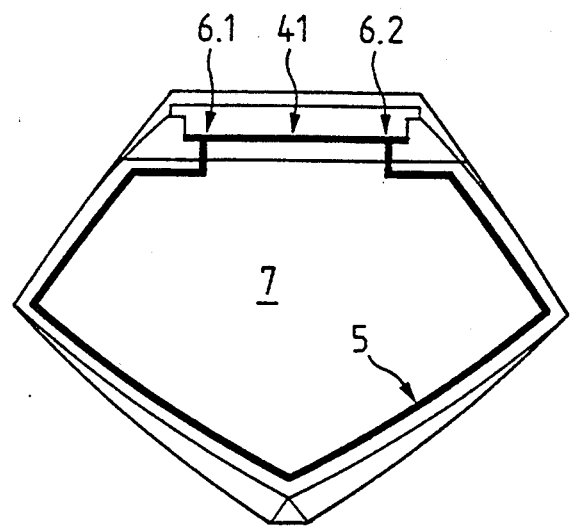
FIG. 9 An embodiment of the inventive closure unit in section (section plane in the pouting opening) with a predetermined breaking point and a connection zone forming the continuation of the predetermined breaking point.

FIG. 9 shows a section through a closure unit according to FIG. 1, with the pouring opening 7 in the section plane and therefore also the predetermined breaking point 5 and if the latter does not go all around the pouring opening a hinge zone 41 which consists e.g. of a narrow zone of thin and therefore flexible material. In such a case a narrow zone of thin material provided as predetermined breaking point 5 and a narrow zone of thin material provided as flexible connection (hinge zone 41) between pouring part and closure part form together a closed line round the pouring opening.

Predetermined breaking points cause no problems, if they extend from one edge of a material area to another edge thereof, or if they are closed. If they terminate in the interior of a material area, as in the present case, at the end of the predetermined breaking point there is a zone which is deformed, but not intended to break when the predetermined breaking point is broken open. There is always a risk in said zone, that as a result of the careless breaking of the predetermined breaking point, material immediately outside said point is broken or is weakened by fine cracks and that said cracks are further propagated into the material during further use.

In other uses at the end of predetermined breaking points holes are made, which prevent a further tearing from the predetermined breaking point into the material not belonging to the latter. However, this is not advantageous in the present case, because the material area extending from the pouting part into the closure part must also fulfil a sealing function between the two parts.

Figure 10:
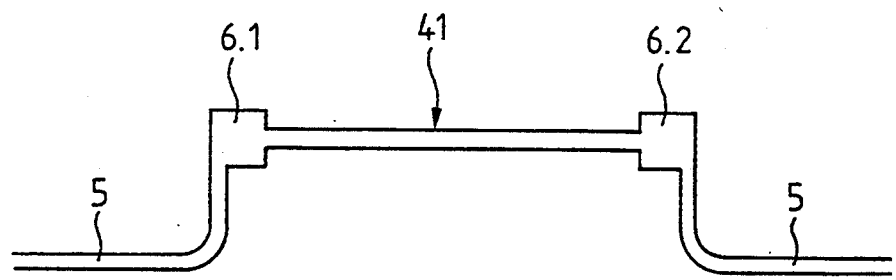
FIG. 10 the predetermined breaking point end zones of the embodiment according to FIG. 9.

As visible in FIG. 10 which is a larger scale detail of FIG. 9, the inventive closure unit has in the end zones of the predetermined breaking point two wider zones of thin material (6.1 and 6.2), which can be treated during the production process for additional elasticity and flexibility. The two predetermined breaking point end zones form during the breaking open of the breaking point, the end points thereof and the angle points for the pivoting movement of the closure part. They are deformed when breaking open the predetermined breaking point, but do not tear. Thus, they serve as buffer zones between the moved zones of the predetermined breaking point and the immediate vicinity thereof and the material zones not to be influenced by the predetermined breaking point. The predetermined breaking point end zones are flat, thin and, if necessary, treated for increased elasticity and flexibility.

The predetermined breaking point end zones of the inventive closure unit measure across their surface 0.1 to 1.5 mm and have a thickness of 0.05 to 0.3 min. They can have a random shape, but it is advantageous to avoid sharp comers.

The predetermined breaking point end zones are moulded during the manufacture of the closure unit and then pressed, so that the structure of the plastic changes, in that the macromolecules are reoriented compared with the moulded state. The predetermined breaking point end zones are moulded in a first moulding stage of the multimaterial injection moulding process from a material A in a gap between two moulds. Then at least one of the moulds is moved or replaced by a new one, in such a way that the gap becomes narrower than in the first moulding stage. As a result the blank is in this zone compressed, so that the material becomes thinner and the desired macromolecule reorientation is achieved. It is not possible in the second moulding stage to mould the second material round the point to be pressed.

The moulding gap for the first moulding stage in the vicinity of the predetermined breaking point end zones can be up to approximately 40% wider than for the second moulding stage, so that the material thickness in these zones is reduced by the mould of the second stage pressing effect for the second stage by up to 40%.

Figure 11:
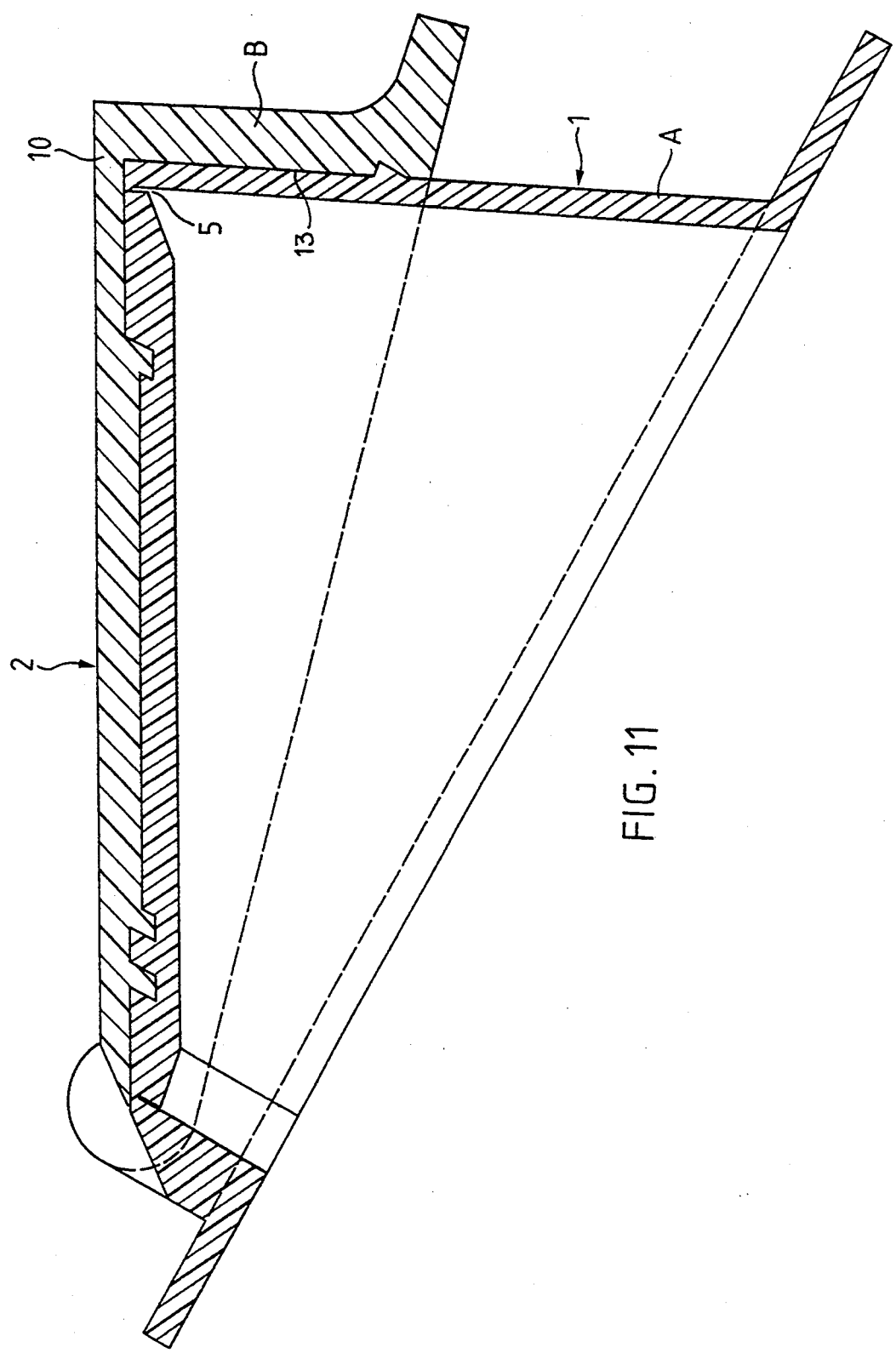
FIG. 11 an exemplified embodiment of the closure unit with outer protection/support zone only in section like FIG. 1.

FIG. 11 shows a further embodiment of the inventive closure unit, which has an outer protection/support zone 10 only and on which the area of the material (A) extends as described in connection with the FIGS. 9 and 10 all round the pouting opening from the pouting part 1 into the closure part 2. On this embodiment the area of the material A extends over the whole of the inner surface of the closure unit An inner closure unit surface of only one material is especially advantageous for applications for which the choice of materials to be used is limited, as e.g. in food packaging, where in certain countries there are laws defining the materials allowed for contact with certain foodstuffs (especially for storage). Such e.g. milk is only allowed to be stored in contact with polyethylene. If for an embodiment according to FIG. 11 therefore Material A is polyethylene, the choice of material B is still very wide even for the application with milk.

If the closure unit has, besides a hinge zone 41 (shown also in FIGS. 9 and 10) consisting of a narrow zone of thin material, e.g. on both sides of this zone 41 further hinge parts (as described in copending U.S. application Ser. No. 02/986,911, filed Dec. 8, 1992) consisting each of a bearing part shaped onto the pouring part and consisting of the material A and a pivot part shaped onto the closure part, consisting of the material B and pivotally movable in the bearing part, or if the hinge consists only of such bearing/pivot part pairs, the area of the material A must be specially formed in this area if it is to cover the whole inner surface of the pouring unit.

Figure 12:
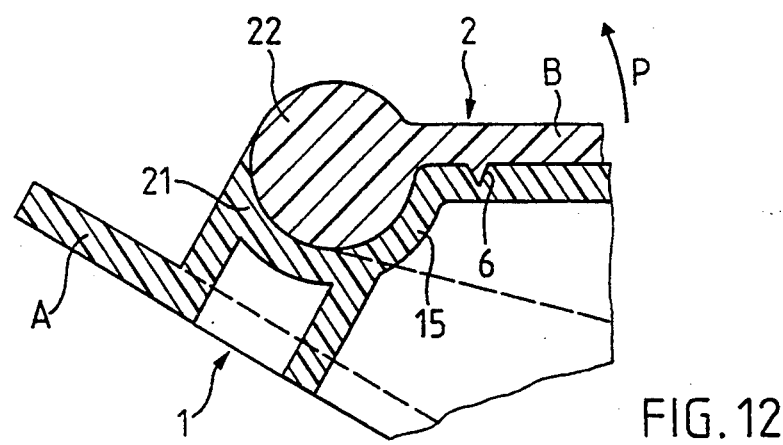
FIG. 12 a hinge zone detail of the embodiment according to FIG. 11 in section.

This is shown in FIG. 12. The bearing part 21 is shaped onto the pouring part 1 and consists of material A. The pivot part 22 is shaped onto the closure part 2 and consists of the material B. The area of the material A extends in a zone 15 on the inside of the pivot part 22 into the closure part 2. If the closure part 2 for opening is pivoted in the direction of arrow P the pivot part 22 pivots in bearing part 21 and zone 15 is either extended or broken in a point shaped as a predetermined breaking point (further predetermined breaking point 6).

Polyethylene has e.g. an extensibility of about eight times the thickness of a film, so that zone 15 can be provided as extension zone. For less extensible materials a further predetermined breaking point 6 has to be provided. According to the Swiss applications No. 2739/91 and 2740/91 mentioned in the beginning, the closure unit is moulded in a closed state, i.e. it is mounted on the container with an intact inner covering of material A even in the case of a provided further predetermined breaking point 6. As the closure unit is opened only when first used, the inner covering remains intact for storage. After the first opening the further predetermined breaking point 6 is broken and therefore the material B underneath is freed in a place, but this place is above the liquid in the container, even on pouting. In the reclosed state of the closure unit, the broken apart edges of the further predetermined breaking point 6 are pressed together again preventing again a contact between stored good and material B.

I claim:

1. A closure unit made for thermoplastic material for mounting on a container for handling and storing flowable products, the closure unit comprising:

a substantially tubular pouring part (1) having a pouring opening therein;

a closure part (2) closing the pouring opening of said pouring part;

said closure unit being made from at least first and second single materials (A and B), said first and second single materials differing from each other in at least one characteristic;

at least one area of said closure unit being made only from said first single material (A) and extending both in said pouring part (1) and in said closure part (2) and forming a predetermined linear thin area breaking point (5) at least partly extending around a circumference of said pouring opening of said pouring part;

another area of said closure unit being made only from said second single material (B) and having a protection and support zone (10, 11) which closely covers and closely contacts said at least one area which forms said predetermined breaking point (5) and at least an immediately surrounding area on one of an inside and outside of said closure unit;

wherein, on a closure part side of said predetermined breaking point (5), said another area of said closure unit including said protection and support zone (10,11), is firmly connected to at least a portion of said at least one area having said predetermined breaking point;

wherein, on a pouring part side of said predetermined breaking point (5), said another area of said closure unit being one of adhering only slightly and not adhering at all, to said at least one area having said predetermined breaking point and forming a pair of mutually contacting sealing surfaces (13) together with said at least one area having said predetermined breaking point; and said protection and support zone (10, 11) comprising:
- an outer support zone (10) which is located on the outside of said closure unit and which firmly contacts a closure part portion in the vicinity of said predetermined breaking point (5); and on the closure part side of said predetermined breaking point;
- an inner support zone (11) provided on the inside of said closure unit, said inner support zone (11) being made of the same second material (B) as said outer support zone (10), and said inner support zone (11) firmly contacting a closure part portion on the closure part side of said predetermined breaking point in the vicinity of said predetermined breaking point (5);
- said another area of said closure unit comprising said outer support zone (10), said inner support zone (11) and one of the sealing surfaces of said pair of sealing surfaces (13).

2. The closure unit of claim 1, further comprising a self-closure member (12), provided between an area having said predetermined breaking point and said protection and support zone, for providing a firm connection between an area having said predetermined breaking point and said protection and support zone.

3. The closure unit of claim 1, wherein said at least one area having said predetermined breaking point is connected by melted surfaces to adhere to said protection and support zone on said pouring part side.

4. The closure unit of claim 1, wherein said at least one area having said predetermined breaking point is connected by a binder to adhere to said protection and support zone on said pouring part side.

5. The closure unit of claim 1, wherein said at least one area having said predetermined breaking point is connected by melted surfaces to adhere to said inner support zone.

6. The closure unit of claim 1, wherein said at least one area having said predetermined breaking point is connected buy a binder to adhere to said inner support zone.

* * * * *